United States Patent
Wiemker et al.

(10) Patent No.: US 8,934,697 B2
(45) Date of Patent: Jan. 13, 2015

(54) IMAGE PROCESSING APPARATUS

(75) Inventors: Rafael Wiemker, Kisdorf (DE);
Thomas Buelow, Grosshansdorf (DE);
Martin Bergtholdt, Hamburg (DE);
Kirsten Meetz, Hamburg (DE);
Ingwer-Curt Carlsen, Hamburg (DE)

(73) Assignee: Koninklijke Philips N.V., Eindhoven (NL)

(*) Notice: Subject to any disclaimer, the term of this patent is extended or adjusted under 35 U.S.C. 154(b) by 65 days.

(21) Appl. No.: 13/988,770

(22) PCT Filed: Nov. 22, 2011

(86) PCT No.: PCT/IB2011/055232
§ 371 (c)(1),
(2), (4) Date: May 22, 2013

(87) PCT Pub. No.: WO2012/069990
PCT Pub. Date: May 31, 2012

(65) Prior Publication Data
US 2013/0236124 A1    Sep. 12, 2013

(30) Foreign Application Priority Data
Nov. 26, 2010   (EP) .................... 10192753

(51) Int. Cl.
*G06K 9/00* (2006.01)
*G06K 9/32* (2006.01)
(Continued)

(52) U.S. Cl.
CPC ............. *G06T 11/60* (2013.01); *G06T 11/00* (2013.01)
USPC ........................... 382/132; 382/162; 382/294

(58) Field of Classification Search
None
See application file for complete search history.

(56) References Cited

U.S. PATENT DOCUMENTS 7,817,723 B2 * 10/2010 Wiegand et al. .......... 375/240.27
8,787,692 B1 *  7/2014 Han et al. ..................... 382/238
(Continued)

FOREIGN PATENT DOCUMENTS

WO   2006080836 A2   8/2006
WO   2010084390 A1   7/2010

OTHER PUBLICATIONS

Malik, Muhammad Muddassir et al "Comparative Visualization for Parameter Studies of Dataset Series", IEEE Transactions on Visualization and Computer Graphics, vol. 16, No. 5. Sep./Oct. 2010, pp. 829-840.
(Continued)

*Primary Examiner* — Andrae S Allison

(57) ABSTRACT

Image processing apparatus (100) for creating an overlaid presentation of a first input image (101) and a second input image (102) in an output image (108), the first input image comprising input values, the output image comprising vectors of output values, the vectors of output values representing colors of the output image, and the apparatus comprising an input (110) for obtaining the first input put image and the second input image, a rendering unit (140) configured for rendering the first input image in the output image by using a first mapping function for representing the input values in the vectors of output values, a predictor (120) configured for predicting the second input image from the first input image for obtaining a predicted second input image (104), a residual calculator (130) configured for calculating a residual image (106) from the second input image and the predicted second input image, the residual image comprising residual values representing prediction errors of the predicted second input image, and the rendering unit being further configured for rendering the residual image in the output image by using a second mapping function for representing the residual values in the vectors of output values, the second mapping function being different from the first mapping function for distinguishing the residual image from the first input image.

15 Claims, 2 Drawing Sheets

(51) Int. Cl.
*G06T 11/60* (2006.01)
*G06T 11/00* (2006.01)

(56) References Cited

U.S. PATENT DOCUMENTS

| | | | |
|---|---|---|---|
| 2006/0004275 A1* | 1/2006 | Vija et al. | 600/407 |
| 2006/0126734 A1* | 6/2006 | Wiegand et al. | 375/240.12 |
| 2008/0226149 A1* | 9/2008 | Wischmann et al. | 382/131 |
| 2008/0310760 A1* | 12/2008 | Carlsen et al. | 382/294 |
| 2008/0317383 A1* | 12/2008 | Franz et al. | 382/294 |
| 2009/0052727 A1* | 2/2009 | Eusemann et al. | 382/100 |
| 2009/0257638 A1* | 10/2009 | Kreiser | 382/132 |
| 2012/0008846 A1* | 1/2012 | Meetz et al. | 382/131 |

OTHER PUBLICATIONS

Gering, David T. et al "An Integrated Visualization System for Surgical Planning and Guidance using Image Fusion and an Open MR", Journal of Magnetic Resonance Imaging, vol. 13, pp. 967-975, 2001.

Yang, Yong et al "Medical Image Fusion via an Effective Wavelet-Based Approach", EURASIP Journal on Advances in Signal Processing, vol. 2010, Article ID 579341, 13 pages, 2010.

* cited by examiner

IMAGE PROCESSING APPARATUS

FIELD OF THE INVENTION

The invention relates to an apparatus for, and a method of, creating an overlaid presentation of a first input image and a second input image in an output image.

BACKGROUND OF THE INVENTION

In the fields of image viewing and image display, it may be desirable to combine several images in a single output image. This may be done by creating an overlaid presentation of the several images, comprising visual information of each of the images. For example, several Magnetic Resonance (MR) images, each being of a different acquisition type, may be combined in a single output image for allowing a clinician to more easily jointly observe the images. Similarly, several images of a surveyed area, each being obtained by a different remote sensing device, may be combined in a single output image for allowing an observer to obtain all relevant information of the surveyed area from the single output image.

It is known to combine several images in a single output image by using a color overlay. For example, US 2009/0257638 describes a method of visualizing an overlaid presentation of x-ray images. The method comprises adding a selected color to a first image, adding a complementary color to a second image, and overlaying both images. As a result, deviations in the overlaying remain identified with one of the added colors, whereas identically overlaid image parts are identified in the overlaid presentation with a gray level.

A problem of the method of US 2009/0257638 is that the overlaid presentation of the first image and the second image is insufficiently intuitive to a viewer.

SUMMARY OF THE INVENTION

It would be advantageous to have an improved apparatus or method for creating an overlaid presentation of a first image and a second image.

To better address this concern, a first aspect of the invention provides an image processing apparatus for creating an overlaid presentation of a first input image and a second input image in an output image, the first input image comprising input values, the output image comprising vectors of output values, the vectors of output values representing colors of the output image, and the apparatus comprising an input for obtaining the first input image and the second input image, a rendering unit configured for rendering the first input image in the output image by using a first mapping function for representing the input values in the vectors of output values, a predictor configured for predicting the second input image from the first input image for obtaining a predicted second input image, a residual calculator configured for calculating a residual image from the second input image and the predicted second input image, the residual image comprising residual values representing prediction errors of the predicted second input image, and the rendering unit being further configured for rendering the residual image in the output image by using a second mapping function for representing the residual values in the vectors of output values, the second mapping function being different from the first mapping function for distinguishing the residual image from the first input image.

The image processing apparatus receives a first and a second input image, and generates an output image that contains a mixture of both input images. The first and the second input image may be associated, e.g., by comprising a same or related object. The first input image comprises input values. The output image comprises vectors of output values, each vector of output values representing a color of a portion of the output image, i.e., relating to a perception of light having a certain luminance and chromaticity. The apparatus receives the first input image and the second input image, using an input. The rendering unit then displays the first input image in the output image by modifying or generating the vectors of output values in dependence on the input values and a first mapping function. The first mapping function thus determines how the first input image is represented in the output image.

Furthermore, the apparatus uses a predictor to predict the second input image from the first input image, using a prediction technique based on, for example, a statistical prediction model or a learned algorithm for converting values of the first input image to the corresponding values of the second input image. This results in a predicted second input image which, depending on the predictability of the second input image, matches the second input image to a certain degree. The residual calculator determines to which degree the second input image matches the predicted second input image by calculating a residual image. The residual image comprises residual values that are indicative of a prediction error and thus are indicative of the predictability of the second input image, given the first input image. The rendering unit then displays the residual image in the output image by modifying or generating the vectors of output values in dependence on the residual values and a second mapping function. The second mapping function thus determines how the residual image is represented by the colors of the output image. Since both the first and the second mapping functions are different, the residual image is represented differently in the output image than the first input image. Thus, the residual image is visually differentiated from the first input image in the output image.

The invention is partially based on the recognition that, in general, an overlaid presentation of multiple input images in an output image may be confusing to a viewer of the output image. The reason for this is that each input image comprises visual information. By combining the visual information of multiple input images in a single output image, the combined visual information in the output image may be relatively large. Disadvantageously, the viewer may be confused by being relatively overloaded with visual information.

Moreover, an overlaid presentation of multiple input images in which differences between the multiple input images are highlighted with respect to similarities between the multiple input images may still be confusing to the viewer. The reason for this is that not all differences between the multiple input images may be relevant to the viewer. In particular, predictable differences between the multiple input images may not be relevant, since predictable differences only add visual information that is predictable and thus expected by the viewer. Hence, instead of highlighting all the differences between the multiple input images, it is desirable to highlight only differences that are relatively unpredictable.

The above measures of the first aspect of invention have the effect that the first input image and a residual image are rendered in the output image. The residual image represents a prediction error of the predicted second input image, and is thus indicative of how well the second input image can be predicted from the first input image. The residual image is therefore indicative of relatively unpredictable information in the second input image. Hence, instead of rendering all of the second input image, or all differences between both input images, the second input image is rendered in the form of a residual image being indicative of the relatively unpredictable information in the second input image. Furthermore, the first input image and the residual image are rendered using different mapping functions. Hence, the residual image is visually distinguished from the first input image in the output image. The above measures result in a more intuitive overlaid presentation of the first input image and the second input image in the output image. Advantageously, the viewer may be less overloaded with visual information in the output image. Advantageously, the viewer may more easily discern relevant information contained in the output image.

Optionally, the first input image and the second input image are monochromatic images, and the first mapping function comprises mapping the input values to first portions of the respective vectors of output values, the first portions comprising at least luminances of the vectors of output values, and the second mapping function comprises mapping the residual values to second portions of the respective vectors of output values, the second portions comprising at least one of: hues, saturations, chromaticities, and transparencies of the vectors of output values, and the second portions being different from the first portions.

The first input image is represented by at least the luminances of the colors of the output image, and the residual image is represented by at least one of: hues, saturations, chromaticities, and transparencies of the colors of the output image. Advantageously, the residual image is better distinguished from the first input image in the output image.

Optionally, the residual values comprise positively signed residual values and negatively signed residual values for representing respective signs of the prediction errors, and the rendering unit is configured for using the second mapping function for representing the positively signed residual values in the vectors of output values, and using an alternative second mapping function for representing the negatively signed residual values in the vectors of output values, the alternative second mapping function being different from the second mapping function for distinguishing positively signed residual values from negatively signed residual values.

The negative portions of the residual image are represented differently in the colors of the output image than the positive portions of the residual image. The negative portions may correspond to so-termed undershoot portions, and the positive portions may correspond to so-termed overshoot portions. Advantageously, overshoot portions of the residual image are better distinguished from undershoot portions in the output image.

Optionally, the second input image comprises further input values, the predictor is configured for predicting the second input image from the first input image by using a statistical prediction model, and the statistical prediction model comprises the input values as independent variables and the further input values as dependent variables. A statistical prediction model is well suited for predicting the second input image from the first input image.

Optionally, using the statistical prediction model comprises performing a regression analysis. A regression analysis is well-suited for predicting the second input image from the first input image.

Optionally, the input values are a subset of all input values of the input image, and the second input values are a further subset of all further input values of the second input image. By using a subset of all of the input values and of all of the further input values, fewer input values and further input values are used in the statistical prediction model. Consequently, the computational complexity of predicting the second input image from the first input image is reduced. Advantageously, the image processing apparatus operates faster.

Optionally, the first input image is of a first image type, the second input image is of a second image type, and the predictor comprises learned data indicative of a statistical relationship between the first image type and the second image type for predicting the second input image from the first input image.

When the first input image is of a certain image type, and the second input image is of another image type, the second input image may be predicted from the first input image by using previously obtained learned data that is indicative of a statistical relationship between the first image type and the second image type. Thus, the prediction of the second input image is based on learned data from a learning process. Advantageously, the learning process may use a relatively large set of learning data for obtaining an improved prediction. Advantageously, the learning process may be designed to reflect a human prediction process for obtaining a prediction of the second input image that reflects one of the viewers.

Optionally, the input is configured for obtaining a third input image, and the predictor is configured for predicting the second input image from the first input image and from the third input image for obtaining the predicted second input image.

Advantageously, by basing the prediction also on a third input image in addition to the first input image, an improved prediction may be obtained.

Optionally, the predictor is further configured for predicting the third input image from the first input image and the second input image for obtaining a predicted third input image, the residual calculator is further configured for calculating a further residual image from the third input image and the predicted third input image, the further residual image comprising further residual values representing further prediction errors of the predicted third input image, and the rendering unit being further configured for rendering the further residual image in the output image by using a third mapping function for representing the further residual values in the vectors of output values, the third mapping function being different from the first mapping function and the second mapping function for distinguishing the further residual image from the first input image and the residual image.

The further residual image represents a prediction error of the predicted third input image, and is thus indicative of how well the third input image can be predicted from the first input image and the second input image. Hence, instead of rendering all of the third input image, or all differences of the third input image with respect to the first input image and the second input image, the third input image is rendered in the form of a further residual image being indicative of the relatively unpredictable information in the third input image. Furthermore, the further residual image is rendered using a different mapping function than that of the first input image and the residual image. Hence, the further residual image is visually distinguished from the first input image and the residual image in the output image. The above measures result in a more intuitive overlaid presentation of the first input image, the second input image and the third input image in the output image. Advantageously, the viewer may be less overloaded with visual information in the output image. Advantageously, the viewer may more easily discern the relevant information in the output image.

Optionally, a workstation comprises the image processing apparatus set forth.

Optionally, the workstation further comprises a user input for enabling a user to interactively select the first mapping function and/or the second mapping function amongst a plurality of mapping functions.

Advantageously, the user may interactively select a mapping function that optimally distinguishes the residual image from the first input image in the output image.

Optionally, the workstation further comprises a user input for enabling a user to interactively select the first input image and/or the second input image amongst a plurality of input images.

Advantageously, the user may interactively select an input image as the first input image and/or the second input image that is of particular relevance to the user. Advantageously, the user may interactively select which of the input images is shown in the output image in the form of a residual image.

Optionally, an imaging apparatus comprises the image processing apparatus set forth.

Optionally, a method of creating an overlaid presentation of a first input image and a second input image in an output image is provided, the first input image comprising input values, the output image comprising vectors of output values, the vectors of output values representing colors of the output image, wherein the method comprises obtaining the first input image and the second input image, rendering the first input image in the output image by using a first mapping function for representing the input values in the vectors of output values, predicting the second input image from the first input image for obtaining a predicted second input image, calculating a residual image from the second input image and the predicted second input image, the residual image comprising residual values representing prediction errors of the residual image, and rendering the residual image in the output image by using a second mapping function for representing the residual values in the vectors of output values, the second mapping function being different from the first mapping function for distinguishing the residual image from the first input image.

Optionally, a computer program product comprises instructions for causing a processor system to perform the method set forth.

It will be appreciated by those skilled in the art that two or more of the above-mentioned embodiments, implementations, and/or aspects of the invention may be combined in any way deemed useful.

Modifications and variations of the image processing apparatus, the workstation, the imaging apparatus, the method, and/or the computer program product, which correspond to the described modifications and variations of the image processing apparatus, can be carried out by a person skilled in the art on the basis of the present description.

A person skilled in the art will appreciate that the method may be applied to multi-dimensional image data, e.g. two-dimensional (2-D), three-dimensional (3-D) or four-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM). A dimension of the multi-dimensional image data may relate to time. For example, a three-dimensional image may comprise a time domain series of two-dimensional images.

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1:
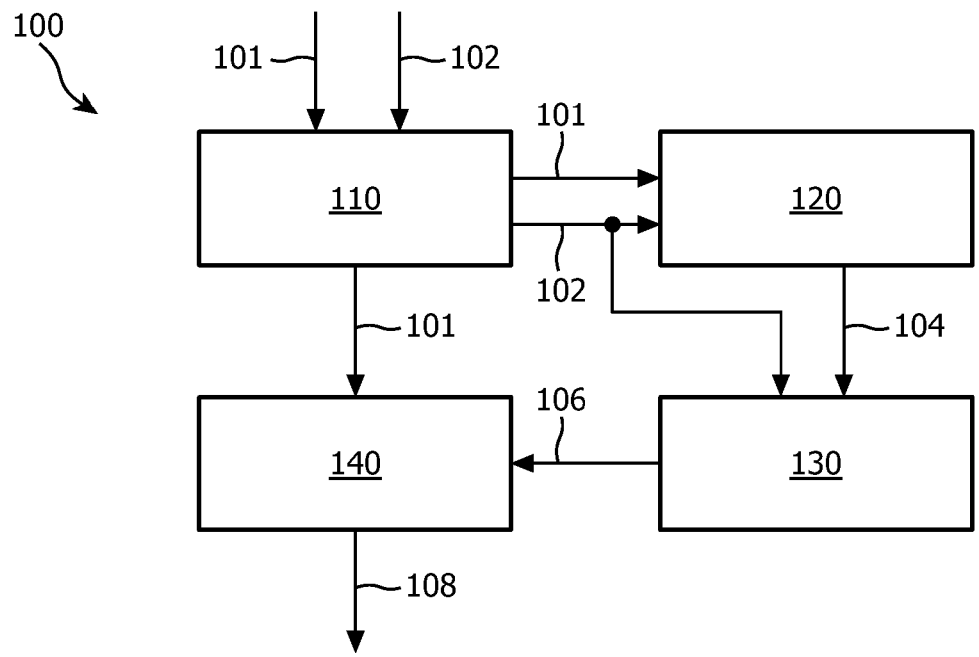
FIG. 1 shows an image processing apparatus for creating an overlaid presentation of a first input image and a second input image in an output image.

FIG. 1 shows an image processing apparatus 100, henceforth referred to as apparatus 100, for creating an overlaid presentation of a first input image 101 and a second input image 102 in an output image 108. The apparatus 100 comprises an input 110 for obtaining the first input image 101 and the second input image 102. The apparatus 100 further comprises a predictor 120 that is shown to be connected to the input 110 for obtaining the first input image 101 and the second input image 102. The predictor 120 generates a predicted second input image 104. The apparatus 100 further comprises a residual calculator 130 that is shown to be connected to the predictor 120 for obtaining the predicted second input image 104 and to the input 110 for obtaining the second input image 102. The residual calculator 130 generates a residual image 106. The apparatus 100 further comprises a rendering unit 140 that is shown to be connected to the input 110 for obtaining the first input image 101 and to the residual calculator 130 for obtaining the residual image 106. The rendering unit 140 generates the output image 108.

During operation of the apparatus 100, the first input image 101 and the second input image 102 are obtained by the input 110. The rendering unit 140 renders the first input image 101 in the output image 108 by using a first mapping function. The predictor 120 predicts the second input image 102 from the first input image 101 for obtaining a predicted second input image 104. The residual calculator 130 calculates a residual image 106 from the second input image 102 and the predicted second input image 104. The rendering unit 140 then renders the residual image 106 in the output image 108 by using a second mapping function, the second mapping function being different from the first mapping function for distinguishing the residual image 106 from the first input image 101.

It is noted that the term image refers to a multi-dimensional image, such as a two-dimensional image or a three-dimensional image. The three-dimensional image may be a volumetric image, i.e., having three spatial dimensions. The image is made up of image elements. The image elements may be so-termed picture elements, i.e., pixels, when the image is a two-dimensional image. The image elements may also be so-termed volumetric picture elements, i.e., voxels, when the image is a three-dimensional volumetric image.

The term value refers to a displayable property that is assigned to the image element. For example, the input values of the first input image 101 may relate to density values, which may be displayed by light having a certain luminance and/or chromaticity. Similarly, the input value may also directly represent a luminance value, e.g., by having been previously acquired by a camera. The input value may be associated with monochromatic display. This may be the case when the input value is commonly represented as a luminance value with a chromaticity that corresponds to grey or white. Furthermore, the image elements of the output image 108 have multiple output values assigned to each of them. The multiple output values jointly, i.e., when considering the multiple output values as a vector, represent a color of the image element in a particular color space.

The term color refers to a perception of light having a certain luminance and chromaticity. It is noted that the chromaticity of the color may be such that the color of an image element appears to be a shade of grey. The exact color that is represented by the vector of output values may be determined by considering the vector of output values within a color space that is associated with the vector of output values. The vector of output values may be associated with any known color space from the technical fields of color science or display technology. For example, the color space may be a HSL color space. In this case, each vector may be formed by three output values, the first of which relates to a hue of the color, the second to a saturation of the color, and the last to a luminance of the color. Moreover, one of the output values may relate to a transparency of the color. For example, the color space may be a RGBA color space. In this case, each vector may be formed by four output values, the first of which relates to a luminance of a red color, the second to a luminance of a green color, the third to a luminance of a blue color, and the fourth to a transparency value, i.e., a so-termed alpha-channel value, of the color. Therefore, the color perceived by a viewer may depend on the color of a particular image element, and on the colors of image elements located behind the particular image element.

The first input image 101 as obtained by the input 110 of the apparatus 100 may be a three-dimensional volumetric image acquired by a Magnetic Resonance (MR) imaging technique. The first input image 101 may also be of a particular acquisition type, e.g., associated with a particular protocol or contrast. For example, the first input image 101 may be a so-termed native T1-weighted image, a dynamic contrast enhanced image (T1-DCE), a T2-weighted image, or a diffusion weighted image (DWI) having a particular b-value. However, the first input image 101 may also be from a non-medical field.

The rendering unit 140 is configured for rendering the first input image 101 in the output image 108 by using a first mapping function for representing the input values in the vectors of output values. Therefore, the first mapping function indicates how the input value of a particular image element of the first input image 101 is represented in the vector of output values of an associated image element of the output image 108. Said association may be a spatial association, i.e., being located at a same spatial location within each image, or referring to a same object or part of the object within each image.

Representing the input values in the vectors of output values may comprise mapping the input values to a particular one of the respective output values. For example, when the vector of output values is associated with a HSL color space, the first mapping function may map the input value to the third output value of the vector, for example, by simply replacing an existing value of the third output value by the input value, or by combining the existing value of the third output value with the input value. As a consequence, the first input image 101 may be visualized in the output image 108, using luminance values. Said combining may be a blending.

The combining may take into account a transparency parameter that is associated with the first mapping function.

Representing the input values in the vectors of output values may also comprise mapping the input values to more than one particular output value. For example, the vector of output values may be associated with a RGB color space. The first mapping function may represent the input value as a grey value in the vector of output values, i.e., in the RGB vector. This may be done by mapping the input value to each of the R, G, and B output values for obtaining a grey value representation of the input value. In particular, the input values may be mapped to first portions of the vectors of output values. The first portions may correspond to a luminance of the color of each respective vector of output values. For example, when the vector of output values is associated with a so-termed Lab color space, the first portion may refer to the first output value. Similarly, when the vector of output values is associated with a HSL color space, the first portion may refer to the third output value.

The term portion may also refer to a set of combinations of output values that have a similarity, e.g., relate to a luminance, a hue, a saturation, a chromaticity, or a transparency of the color. For example, when the vector of output values is associated with a RGB color space, the first portion may refer to all combinations of output values that relate to a certain range of hues, e.g., all combinations of R, G, and B that result in orange hues.

The first mapping function may comprise a so-termed color conversion matrix, i.e., a matrix that may be used to map a value to a color. The first mapping function may also be software or hardware that functions as a color conversion matrix.

The predictor 120 is configured for predicting the second input image 102 from the first input image 101 for obtaining a predicted second input image 104. The second input image 102 may also be a three-dimensional volumetric image acquired by a Magnetic Resonance imaging technique. In particular, the second input image 102 may be of a different acquisition type than the first input image 101.

For predicting the second input image 102 from the first input image 101, the predictor 120 may perform a regression analysis. It will be appreciated that regression analysis is a known technique from the technical field of statistics, and thus, many variants of the technique are known and may be used for predicting the second input image 102 from the first input image 101. For example, the predictor 120 may perform a linear regression analysis, where the input values of the first input image 101 are used as so-termed independent variables, and associated further input values of the second input image 102 are used as so-termed dependent variables. Said association may be a spatial association, i.e., being located at a same spatial location within each image, or referring to a same object or part of the object within each image. As a result of the regression analysis, a predicted second input image 104 may be obtained, e.g., by explicitly generating the predicted second input image 104. It will be appreciated that any other suitable statistical prediction model or statistical prediction technique may be used as well, such as, e.g., polynomial regression, support-vector-regression (SVR) or k-nearest-neighbor-regression (KNN).

The residual calculator 130 is configured for calculating a residual image 106 from the second input image 102 and the predicted second input image 104. As a consequence, the residual image 106 comprises residual values representing prediction errors of the predicted second input image 104.

Calculating the residual image 106 may comprise calculating a difference between the second input image 102 and the predicted second input image 104, e.g., by subtracting predicted values of the predicted second input image 104 from associated further input values of the second input image 102. As a consequence, the residual values may comprise signed values, e.g., a positive value when the predicted value is smaller than the further input value, or a negative value when the predicted value is larger than the further input value. Calculating the residual image 106 may also comprise calculating a ratio between the second input image 102 and the predicted second input image 104, e.g., by dividing a predicted value of the predicted second input image 104 by an associated further input value of the second input image 102. The residual values thus represent a relative prediction error of the predicted second image 104. Moreover, a further function may be applied to the ratio or the difference, e.g., for emphasizing particularly large prediction errors, or for de-emphasizing particularly small prediction errors.

The residual calculator 130 may be part of the predictor 120. For example, the predictor 120 may be able to directly calculate the residual image 106, without the need for explicitly generating the predicted second input image 104. For example, the residual image 106 may be obtained by an internally calculated difference between the value of the dependent variable predicted by the statistical prediction model, and the true value of the dependent variable, i.e., a further input value of the second input image 102.

The rendering unit 140 is further configured for rendering the residual image 106 in the output image 108 by using a second mapping function for representing the residual values in the vectors of output values. Similarly to the first mapping function, the second mapping function indicates how the residual value of a particular image element of the residual image 106 is mapped on the vector of output values of an associated image element of the output image 108. It will be appreciated that all the aforementioned aspects of the first mapping function are also applicable to the second mapping function, with the exception that the second mapping function differs from the first mapping function in the manner of mapping, and therefore, the residual values are represented differently in the vectors of output values than the input values. In particular, the second mapping function differs from the first mapping function for visually distinguishing the residual image 106 from the first input image 101 in the output image 108.

In general, the residual image 106 may be distinguished from the first input image 101 by mapping the input values to first portions of the respective vectors of output values, the first portions comprising at least luminances of the vectors of output values, and mapping the residual values to second portions of the respective vectors of output values, the second portions comprising at least one of: hues, saturations, chromaticities, and transparencies of the vectors of output values, and the second portions being different from the first portions. For example, the input values may be represented by luminances of the vectors of output values, and the residual values may be represented as saturations of a particular hue in the vectors of output values. Therefore, the saturation of the first input image 101 within the output image 108 varies in accordance with a prediction error of the predicted second image 104. Similarly, the input values may be represented by luminances having a chromaticity that is associated with a grey color, and the residual values may be represented by luminances having a chromaticity that is associated with a non-grey color.

The rendering unit 140 may be configured for distinguishing positively signed residual values from negatively signed residual values when the residual values are signed values. As a consequence, overshoots and undershoots with respect to the predicted second image 104 are each visualized differently, and thus distinguished within the output image 108. For that purpose, the rendering unit 140 may use an alternative second mapping function for representing the negatively signed residual values, and the second mapping function may be used for representing the positively signed residual values, or vice versa.

The predictor 120 may be configured for using a statistical prediction model, wherein the statistical prediction model comprises a subset of all input values of the input image 101 as independent variables, and a further subset of all further input values of the second input image 102 as dependent variables. The subset and the further subset may be associated, e.g., by having a spatial association, i.e., being located at a same spatial location within each image, or by referring to a same object or part of the object within each image. As a result, the input values and the further input values are sub-sampled. When selecting the subset and the further subset, i.e., the sub-sampling, account may be taken of particularly relevant portions of the images by selecting more input values and further input values from said portions. However, the sub-sampling may also use a regular sub-sampling grid.

The predictor 120 may also comprise learned data indicative of a statistical relationship between a first image type and a second image type for predicting the second input image 102 from the first input image 101. For example, the first input image 101 may be of a different image type than the second input image 102. Here, the term image type may refer to the image having been acquired by a certain imaging type, e.g., an imaging modality, or to a certain setting used during acquisition. For example, the first input image 101 may have been acquired by Magnetic Resonance (MR) imaging, and thus belong to a MR image type. The second input image 102 may have been acquired by Computed Tomography (CT), and thus belong to a CT image type. The learned data may comprise information on how a certain input value from MR relates to a further input value from CT. Therefore, the learned data may be used to generate a predicted second image 104 belonging to the CT image type from a first input image 101 belonging to the MR image type. Similarly, the image type may identify whether the image is a native T1-weighted image, a dynamic contrast enhanced image (T1-DCE), a T2-weighted image, or a diffusion weighted image (DWI) having a particular b-value. Consequently, the predictor 120 may comprise learned data for predicting one of the above image types from another one of the above image types. It will be appreciated that the learned data does not need to be generated by the apparatus 100, but rather may have been originally generated using a learning technique from the technical field of machine learning and may have been already obtained by or included in the apparatus 100.

It will be appreciated that the predictor 120 may use a particular input value from the first input image 101 to predict a predicted value from the predicted second image 104, thereby generating the predicted second image 104. This may be due to a statistical relationship between the input values of the first input image 101 and the further input values of the second input image 102. However, the predictor 120 may also take into account one or more input values surrounding the particular input value for predicting the predicted value. This may allow the predictor 120 to base its prediction not only on the particular input value, but also on its surroundings within the first input image 101, and consequently, information such as a local structure, texture or orientation on or around the particular input value. For example, this may allow the predictor 120 to predict a predicted CT input value from a MR input value and a local texture on or around the MR input value.

Figure 2:
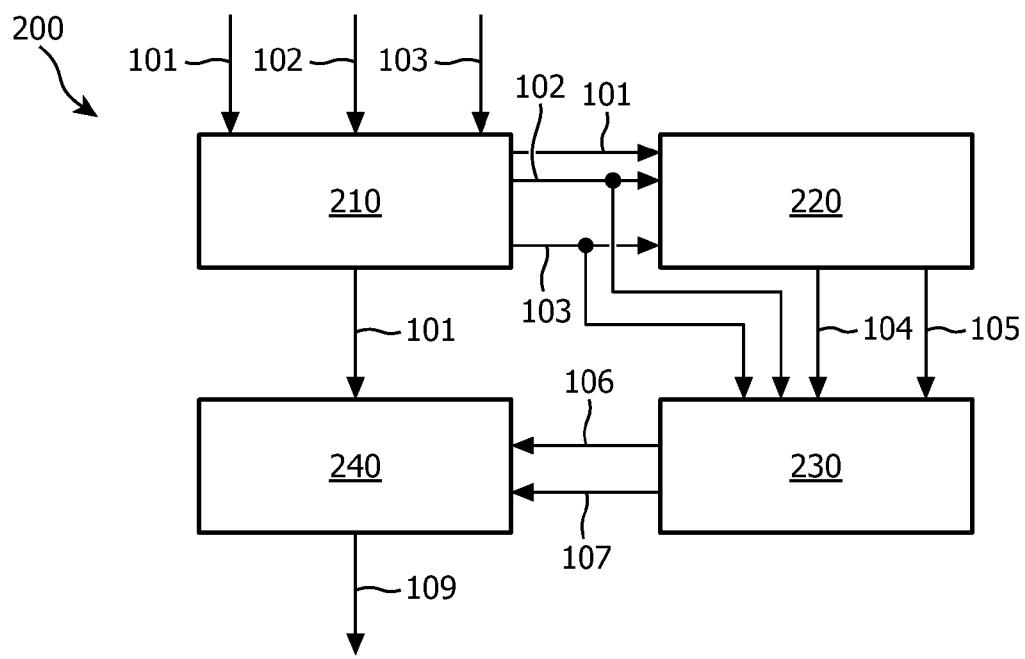
FIG. 2 shows an image processing apparatus for creating an overlaid presentation of a first, a second and a third input image in an output image.

FIG. 2 shows an apparatus 200 being substantially identical to that of FIG. 1, with the exception of the following. The input 210 of the apparatus 200 is configured for obtaining a third input image 103, and the predictor 220 is configured for predicting the second input image 102 from the first input image 101 and from the third input image 103 for obtaining the predicted second input image 104. Hence, the predictor 220 may not only base its prediction on the input values of the first input image 101, but also on those of the third input image 103. It will be appreciated that in general, when having n different input images, the predictor 220 may base its prediction of one of the input images on the remaining n−1 input images. Also, using more input images generally results in an improved prediction.

The apparatus 200 further differs from the apparatus 100 of FIG. 1 in that the apparatus 200 of FIG. 2 is configured for also including the third input image 103 in the overlaid presentation of the first input image 101 and the second input image 102 in the output image 109. For that purpose, the predictor 220 is further configured for predicting the third input image 103 from the first input image 101 and the second input image 102 for obtaining a predicted third input image 105. Also, the residual calculator 230 is further configured for calculating a further residual image 107 from the third input image 103 and the predicted third input image 105, the further residual image 107 comprising further residual values representing further prediction errors of the predicted third input image 105. It will be appreciated that the above predicting of the third input image 103 may be similar or identical to that of the second input image 102, and that the above calculating of the further residual image 107 may be similar or identical to that of the residual image 106.

The rendering unit 240 is further configured for rendering the further residual image 107 in the output image 109 by using a third mapping function for representing the further residual values in the vectors of output values, the third mapping function being different from the first mapping function and the second mapping function for distinguishing the further residual image 107 from the first input image 101 and the residual image 106. It will be appreciated that all the aforementioned aspects of the first and second mapping function are also applicable to the third mapping function, with the exception that the third mapping function differs from the first mapping function and the second mapping function in the manner of mapping, and therefore, the further residual values are represented differently in the vectors of output values than the input values and the residual values.

It will be appreciated that the apparatus 200 of FIG. 2 may also be used for creating an overlaid presentation of more than three input images in an output image, and that a skilled person may perform the necessary modifications of the apparatus in accordance with the above described modifications for including a further input image in the output image.

Figure 3:
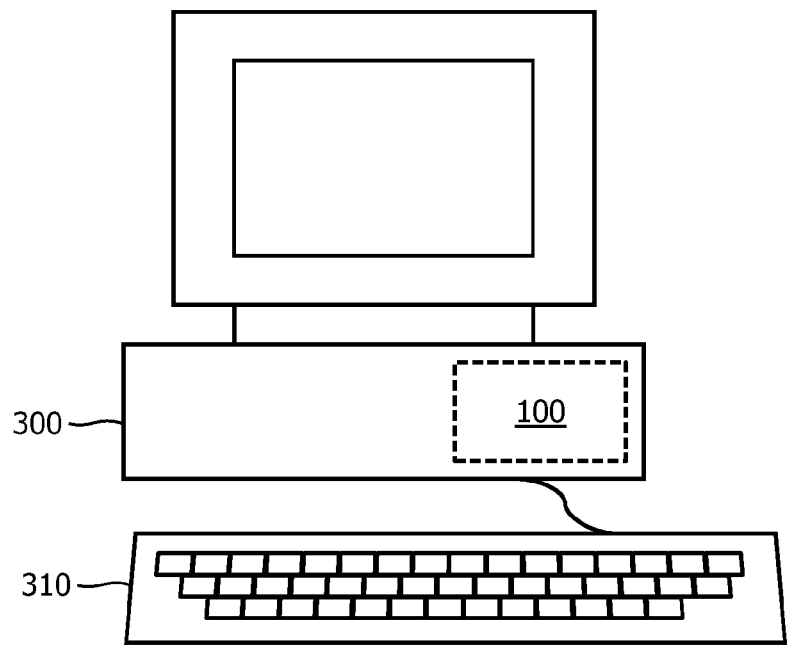
FIG. 3 shows a workstation comprising the image processing apparatus and a user input.

FIG. 3 shows a workstation 300 comprising the apparatus 100 of FIG. 1. The workstation further comprises a user input 310 for enabling a user to interactively select the first mapping function and/or the second mapping function amongst a plurality of mapping functions. For that purpose, the workstation 300 may further comprise (not shown): a processor, storage means, or a communications port. The processor may be arranged for executing instructions that are part of an image processing program. The image processing program may comprise instructions for performing the function of at least a part of the input 110, the predictor 120, the residual calculator 130 and/or the rendering unit 140. The storage means may comprise a RAM, a ROM, a hard disk, removable media such as CD and DVD. The storage means may be used for storing the computer instructions and/or for storing input and/or output images. The communications port may be used for communication with another computer system, for example a server. The communications port may be arranged for being connected to a network such as a local or wide area network and/or the Internet. The other computer system may be accessed via the network, e.g., for retrieving input images.

The user may use the user input 310 to interactively select, e.g., in a menu being displayed on a display of the workstation 300, the first mapping function and/or the second mapping function amongst a plurality of mapping functions. Additionally or alternatively, the user input 310 may enable the user to interactively select the first input image 101 and/or the second input image 102 amongst a plurality of input images. Said selecting may be done by checking or un-checking check-boxes associated with each respective input image, with a checked check-box representing a selection of the input image. Furthermore, the user input 310 may enable the user to determine which of the input images is the first input image 101 and which is the second input image 102.

It will be appreciated that the present invention may be used to combine several gray-value image volumes into a single color-value image volume. Moreover, the present invention may be used when generating a color overlay, i.e., fusion, of multiple MR acquisition types. When using a known overlaying technique, this may result in an overloaded visual appearance. The present invention may use fusion, i.e., the creation of the overlaid presentation, where each additional image volume is first predicted from the previous image volumes, resulting in a predicted image volume, and only the deviation, i.e., the residual image volume, is then added as a color overlay to the overall combined color coded image volume. Said fusion may be interactive by allowing a user to select a color of the color overlay. Thus, the color overlay shows only overshoot and undershoot with respect to the predicted values, and reduces visual overload while retaining color cues.

It will be appreciated that the predictor and the residual calculator together may function as a redundancy reduction or de-correlation, as the predictor may reflect a correlation between, e.g., the first input image and the second input image, in the predicted second input image. Since only a prediction error of the predicted second input image is overlaid in the output image, only the de-correlated or non-redundant information of the second input image is overlaid in the output image. Consequently, the first input image may be overlaid in its entirety, whereas the second input image is overlaid in the form of the non-redundant information of the second input image for reducing the visual overload.

Figure 4:
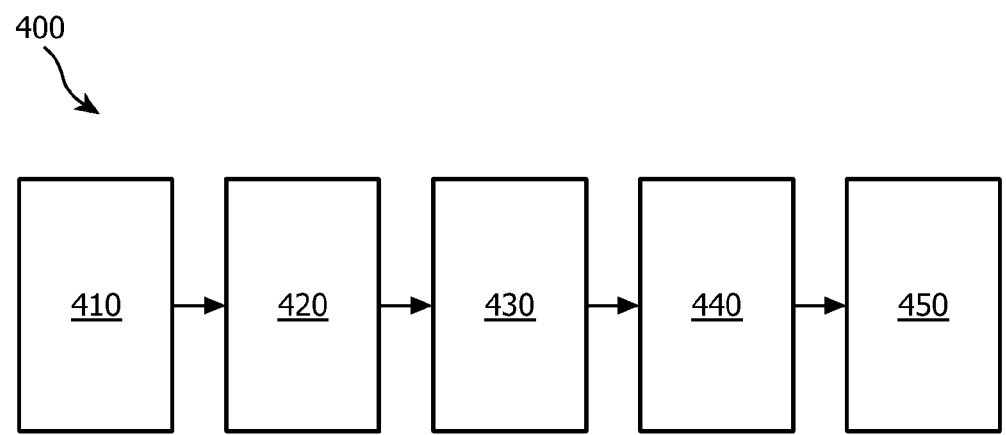
FIG. 4 shows a method of creating an overlaid presentation of a first input image and a second input image in an output image.

FIG. 4 shows a method of creating an overlaid presentation of a first input image and a second input image in an output image, the first input image comprising input values, the output image comprising vectors of output values, the vectors of output values representing colors of the output image, and the method comprising obtaining 410 the first input image and the second input image, rendering 420 the first input image in the output image by using a first mapping function for representing the input values in the vectors of output values, predicting 430 the second input image from the first input image for obtaining a predicted second input image, calculating 440 a residual image from the second input image and the predicted second input image, the residual image comprising residual values representing prediction errors of the residual image, and rendering 450 the residual image in the output image by using a second mapping function for representing the residual values in the vectors of output values, the second mapping function being different from the first mapping function for distinguishing the residual image from the first input image.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. Image processing apparatus (100, 200) for creating an overlaid presentation of a first input image (101) and a second input image (102) in an output image (108, 109), the first input image comprising input values, the output image comprising vectors of output values, the vectors of output values representing colors of the output image, and the apparatus comprising:
   an input (110, 210) for obtaining the first input image and the second input image;
   a rendering unit (140, 240) configured for rendering the first input image in the output image by using a first mapping function for representing the input values in the vectors of output values;
   a predictor (120, 220) configured for predicting the second input image from the first input image for obtaining a predicted second input image (104);
   a residual calculator (130, 230) configured for calculating a residual image (106) from the second input image and the predicted second input image, the residual image comprising residual values representing prediction errors of the predicted second input image; and
   the rendering unit being further configured for rendering the residual image in the output image by using a second mapping function for representing the residual values in the vectors of output values, the second mapping function being different from the first mapping function for distinguishing the residual image from the first input image.

2. Image processing apparatus (100, 200) according to claim 1, wherein the first input image (101) and the second input image (102) are monochromatic images, and wherein:
   the first mapping function comprises mapping the input values to first portions of the respective vectors of output values, the first portions comprising at least luminances of the vectors of output values; and
   the second mapping function comprises mapping the residual values to second portions of the respective vectors of output values, the second portions comprising at least one of: hues, saturations, chromaticities, and transparencies of the vectors of output values, and the second portions being different from the first portions.

3. Image processing apparatus (100, 200) according to claim 1, wherein the residual values comprise positively signed residual values and negatively signed residual values for representing respective signs of the prediction errors, and the rendering unit (140, 240) is configured for:
   using the second mapping function for representing the positively signed residual values in the vectors of output values; and
   using an alternative second mapping function for representing the negatively signed residual values in the vectors of output values, the alternative second mapping function being different from the second mapping function for distinguishing positively signed residual values from negatively signed residual values.

4. Image processing apparatus (100, 200) according to claim 1, wherein the second input image (102) comprises further input values, the predictor (120, 220) is configured for predicting the second input image from the first input image (101) by using a statistical prediction model, and wherein the statistical prediction model comprises the input values as independent variables and the further input values as dependent variables.

5. Image processing apparatus (100, 200) according to claim 4, wherein using the statistical prediction model comprises performing a regression analysis.

6. Image processing apparatus (100, 200) according to claim 4, wherein the input values are a subset of all input values of the input image (101), and the second input values are a further subset of all further input values of the second input image (102).

7. Image processing apparatus (100, 200) according to claim 1, wherein the first input image (101) is of a first image type, the second input image (102) is of a second image type, and the predictor (120, 220) comprises learned data indicative of a statistical relationship between the first image type and the second image type for predicting the second input image from the first input image.

8. Image processing apparatus (200) according to claim 1, wherein:
    the input (210) is configured for obtaining a third input image (103); and
    the predictor (220) is configured for predicting the second input image (102) from the first input image (101) and from the third input image for obtaining the predicted second input image (104).

9. Image processing apparatus (200) according to claim 8, wherein:
    the predictor (220) is further configured for predicting the third input image (103) from the first input image (101) and the second input image (102) for obtaining a predicted third input image (105);
    the residual calculator (230) is further configured for calculating a further residual image (107) from the third input image and the predicted third input image, the further residual image comprising further residual values representing further prediction errors of the predicted third input image; and
    the rendering unit (240) being further configured for rendering the further residual image in the output image (109) by using a third mapping function for representing the further residual values in the vectors of output values, the third mapping function being different from the first mapping function and the second mapping function for distinguishing the further residual image from the first input image and the residual image (106).

10. Workstation (300) comprising the image processing apparatus (100) of claim 1.

11. Workstation (300) according to claim 10, the workstation further comprising a user input (310) for enabling a user to interactively select the first mapping function and/or the second mapping function amongst a plurality of mapping functions.

12. Workstation (300) according to claim 10, the workstation further comprising a user input (310) for enabling a user to interactively select the first input image (101) and/or the second input image (102) amongst a plurality of input images.

13. Imaging apparatus comprising the image processing apparatus of claim 1.

14. Method (400) of creating an overlaid presentation of a first input image and a second input image in an output image, the first input image comprising input values, the output image comprising vectors of output values, the vectors of output values representing colors of the output image, and the method comprising:
    obtaining (410) the first input image and the second input image;
    rendering (420) the first input image in the output image by using a first mapping function for representing the input values in the vectors of output values;
    predicting (430) the second input image from the first input image for obtaining a predicted second input image;
    calculating (440) a residual image from the second input image and the predicted second input image, the residual image comprising residual values representing prediction errors of the residual image; and
    rendering (450) the residual image in the output image by using a second mapping function for representing the residual values in the vectors of output values, the second mapping function being different from the first mapping function for distinguishing the residual image from the first input image.

15. Computer program product comprising instructions for causing a processor system to perform the method according to claim 14.

* * * * *